(12) United States Patent
Wang et al.

(10) Patent No.: US 11,594,242 B2
(45) Date of Patent: Feb. 28, 2023

(54) NOISE EVENT LOCATION AND CLASSIFICATION IN AN ENCLOSED AREA

(71) Applicant: Gulfstream Aerospace Corporation, Savannah, GA (US)

(72) Inventors: Tongan Wang, Savannah, GA (US); Scott Bohanan, Savannah, GA (US); Jim Jordan, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 32 days.

(21) Appl. No.: 17/306,799

(22) Filed: May 3, 2021

(65) Prior Publication Data

US 2022/0351746 A1   Nov. 3, 2022

(51) Int. Cl.
| | |
|---|---|
| *G10L 25/51* | (2013.01) |
| *G06N 20/00* | (2019.01) |
| *G06F 3/16* | (2006.01) |
| *G06N 5/04* | (2023.01) |
| *G10L 15/22* | (2006.01) |
| *G10L 25/18* | (2013.01) |
| *G10L 25/30* | (2013.01) |

(Continued)

(52) U.S. Cl.
CPC .............. *G10L 25/51* (2013.01); *G06F 3/165* (2013.01); *G06F 3/167* (2013.01); *G06N 5/04* (2013.01); *G06N 20/00* (2019.01); *G10L 15/22* (2013.01); *G10L 25/18* (2013.01); *G10L 25/30* (2013.01); *H04R 1/406* (2013.01); *H04R 3/005* (2013.01); *G10L 2015/223* (2013.01); *H04R 2201/401* (2013.01)

(58) Field of Classification Search
CPC ......... G10L 25/51; G10L 15/22; G10L 25/18; G10L 25/30; G10L 2015/223; G06F 3/165; G06F 3/167; G06N 5/04; G06N 20/00; H04R 1/406; H04R 3/005; H04R 2201/401
See application file for complete search history.

(56) References Cited

U.S. PATENT DOCUMENTS

| | | | |
|---|---|---|---|
| 6,122,614 A * | 9/2000 | Kahn .................... | G10L 15/063 704/270 |
| 7,653,925 B2 * | 1/2010 | Hull ....................... | G11B 27/28 715/723 |
| 9,253,560 B2 | 2/2016 | Goldstein et al. | |

(Continued)

*Primary Examiner* — Akelaw Teshale
(74) *Attorney, Agent, or Firm* — LKGlobal | Lorenz & Kopf, LLP

(57) ABSTRACT

A sound pickup transducer array, deployed within an enclosed area, is coupled to a sound recorder. A processor, coupled to the sound recorder, provides a button or speech recognizer through which a person in the enclosed area issues a command signifying the occurrence of a sound for which categorizing is requested. The processor is programmed to respond to the issued command by extracting and storing an audio snippet copied from the audio recorder, in a digital memory, where the snippet corresponds to sound captured before, during and after the issued command. The processor communicates the stored audio snippet to an artificial intelligence system trained to categorize sounds as to what produced them. The artificial intelligence system may employ trained model feature extraction, a neural network categorization system, and/or direction of sound arrival analysis.

12 Claims, 7 Drawing Sheets

(51) Int. Cl.
*H04R 1/40* (2006.01)
*H04R 3/00* (2006.01)

(56) References Cited

U.S. PATENT DOCUMENTS

| | | | | |
|---|---|---|---|---|
| 10,324,979 B2* | 6/2019 | Raanani | ............... | H04M 3/5175 |
| 10,643,637 B2* | 5/2020 | Boulanger | ............ | G06F 16/638 |
| 10,713,497 B2* | 7/2020 | Womack | ................ | G06V 20/41 |
| 11,356,492 B2* | 6/2022 | Suto | ...................... | H04L 65/403 |
| 2007/0274534 A1 | 11/2007 | Lockhart et al. | | |
| 2011/0144993 A1* | 6/2011 | Ruby | ...................... | G10L 17/26 |
| | | | | 704/E15.005 |
| 2020/0013427 A1* | 1/2020 | Boulanger | ............... | G10L 25/51 |
| 2022/0076288 A1* | 3/2022 | Dey | ................... | G06Q 30/0232 |

* cited by examiner

NOISE EVENT LOCATION AND CLASSIFICATION IN AN ENCLOSED AREA

TECHNICAL FIELD

This disclosure relates generally to noise source identification and diagnosis. More particularly the disclosure relates to noise source identification and diagnosis systems in enclosed areas, such as passenger carrying vehicles, ships or buildings.

This section provides background information related to the present disclosure which is not necessarily prior art.

BACKGROUND

As vehicle or ship interior spaces become quieter and quieter—through significant effort on the part of the designers—passengers become able to hear sounds once masked by engine and wind noise, ranging from benign but annoying rattles to an assortment of other ticking, whirring, grinding, buzzing and clunking sounds, all of which could be indicative an onboard system in the process of failing. Noise inside building may also be used to identify underlying problems related to HAVC and other systems.

Naturally, the vehicle owner or passenger wants to identify, diagnose and put a stop to all of these sounds by correcting the underlying causes. Unfortunately, this can be difficult. In the typical aircraft scenario, the abnormal sound heard by a passenger is reported to a member of the crew, who relays the report to the ground maintenance crew, who in turn, may need to contact the aircraft manufacturer's engineering department for guidance. The challenge usually involves trying to reproduce conditions so the maintenance crew and engineering department may hear what the passenger reported. However, when it comes to aircraft, there are many variables involved—yaw, pitch, roll, g-forces, turbulence, temperature, weather conditions, engine rpm, plane weight, runway surface conditions, landing gear position, and so forth. Any one or more of these variables may have a bearing on whether the abnormal sound heard by the passenger can be duplicated. Thus it can be largely hit or miss as to whether the sound can be identified, diagnosed and corrected. Similar discussions also apply to other passenger carrying vehicles such as automobiles or other enclosed area where people may be annoyed by noise issues.

SUMMARY

The disclosed solution employs special on-board microphone array devices that continually capture all sounds inside the enclosed area and store that captured data in a circular buffer sufficient to hold a meaningful amount of data on the sounds before, during and after the event of interest. The microphone array devices each employ multiple microphone transducers, in a predefined physical arrangement, so they can be used to capture direction of arrival information used to pinpoint where every captured sound is coming from.

When a passenger hears an abnormal sound that he or she wants to report, the passenger pushes a button or issues a voice command (which can be picked up by the same microphone array devices), and this command causes the system to copy a portion of the data stored in the circular buffer representing a span of time before, during and after the reported event. Although the circular buffer is constantly being erased and rewritten, the copied portion is stored in a separate memory where it can be analyzed later. If desired, the copied portion may be wirelessly transmitted to a cloud storage server hosted at a ground-based facility, where it can be analyzed using trained model recognizers, neural networks or both, to identify the most likely causes of the reported sound and optionally supplying engineering data on Mean Time Between Failure (MTBF) of components exhibiting the observed sounds.

In addition to recognition of the sounds themselves, the disclosed solution also uses the direction of arrival information to provide a very useful additional dimension to the analysis. In this regard, localization of where the sound is coming from—as heard from a plurality of different microphone array devices at different locations within the aircraft—can be a strong differentiator.

According to one aspect of the disclosed sound event location and identification system, a system for categorizing sounds is provided. The system includes at least one sound pickup transducer or transducer array deployed in a known location within the aircraft. A sound recorder, coupled to the transducer or transducer array, is configured to store sounds captured by the transducer(s).

A processor, coupled to the sound recorder, provides a user interface through which a person within the aircraft issues a command signifying the occurrence of a sound for which categorizing is requested. A user operated button or voiced command may be used. The processor has an associated digital memory that is configured to store at least one audio snippet in association with a timestamp datum. The processor is programmed to respond to the issued command by extracting and storing an audio snippet copied from the audio recorder, where the snippet corresponds to sound captured before, during and after the issued command. The processor has a data transfer port by which the stored audio snippet is communicated to an artificial intelligence system trained to categorize sounds as to what produced them.

The artificial intelligence system may be implemented using a system selected from the group consisting of a trained model recognition system employing feature extraction, a neural network categorization system, a sound direction extraction system that estimates sound direction using time of arrival analysis of sounds captured by the individual transducers, and combinations thereof.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

To aid in locating, categorizing and diagnosing abnormal sounds within an enclosed area, a system of microphone arrays and an electronic data capture circuit is deployed within the enclosed area. The system continually captures sounds in the enclosed area, but only saves a record of a specific abnormal sound in response to a command from a passenger who notices the sound. These saved records are communicated to a data processing center where a multi-stage analysis is performed, to categorize the sound and thereby aid in addressing the cause.

Figure 1:
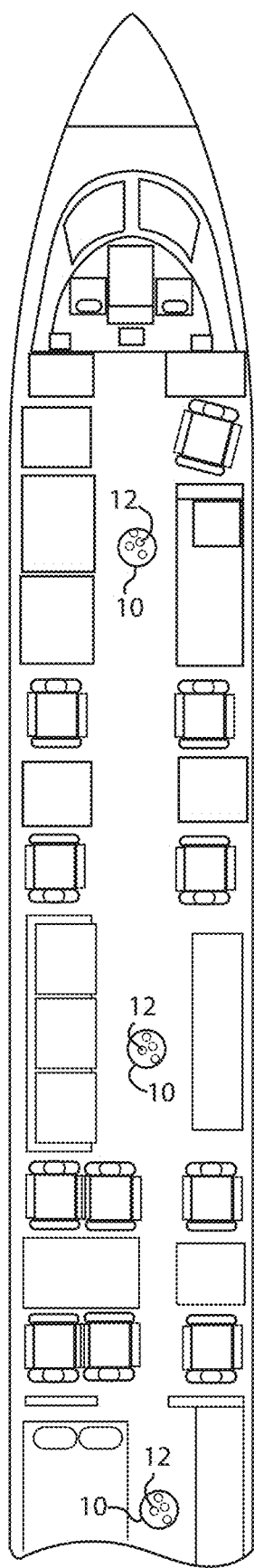
FIG. 1 illustrates an exemplary aircraft cabin, showing suitable locations for placement of the microphone transducer arrays.
Figure 2:
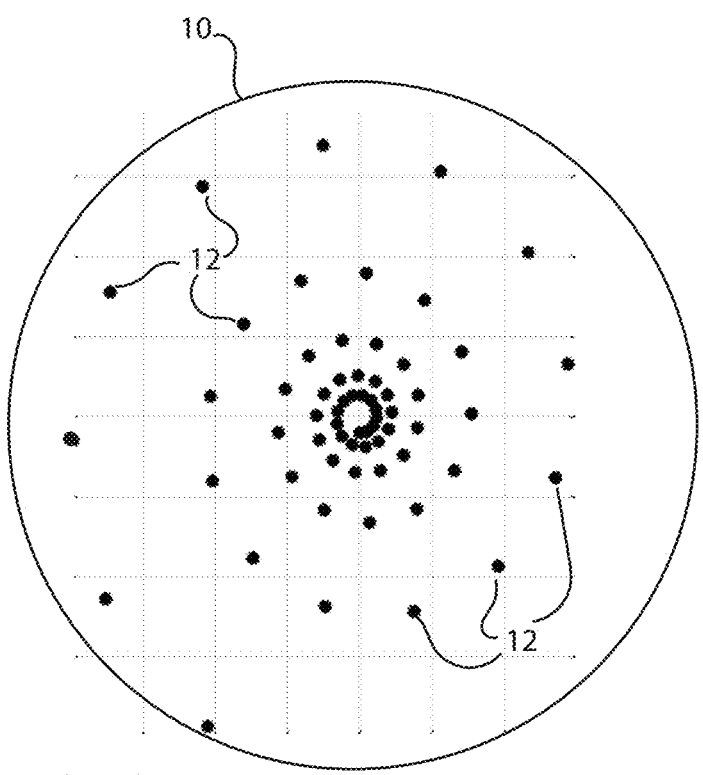
FIG. 2 illustrates one exemplary transducer array, featuring plural microphone transducers arranged in a spiral configuration.
Figure 3:
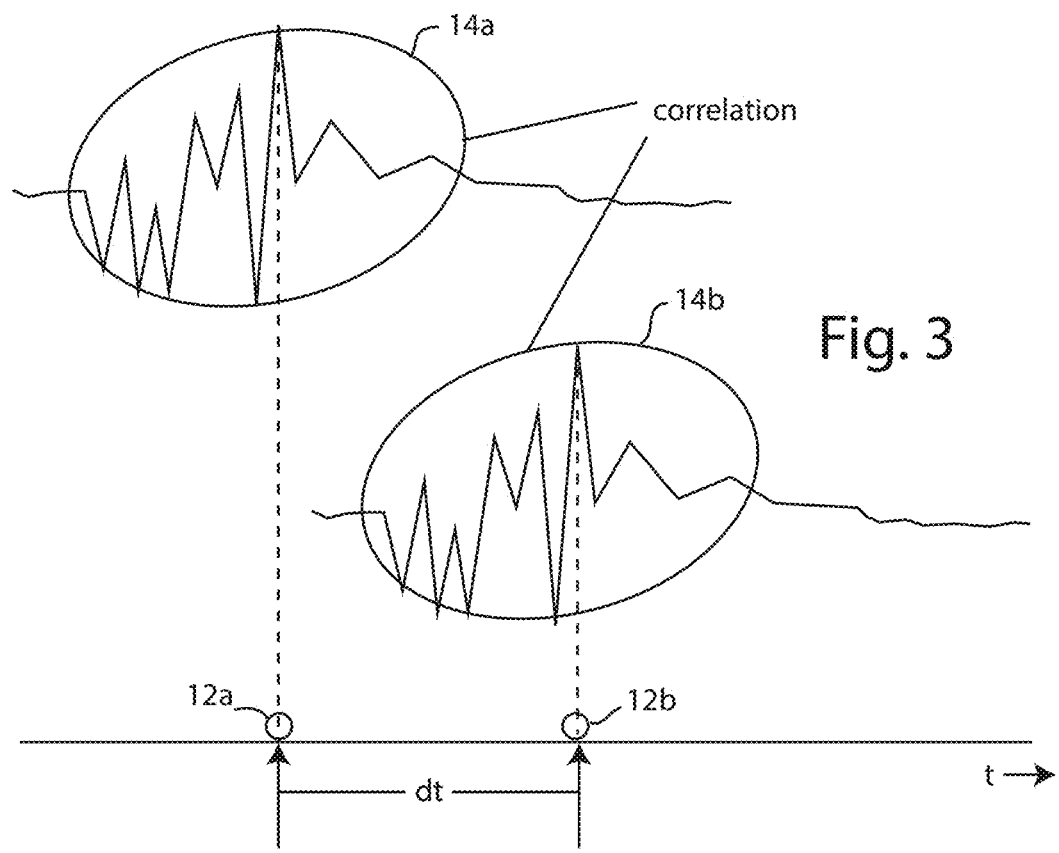
FIG. 3 is an acoustic waveform diagram, illustrating how signals captured by two microphone transducers of the array are correlated and how arrival time difference is measured.
Figure 4:
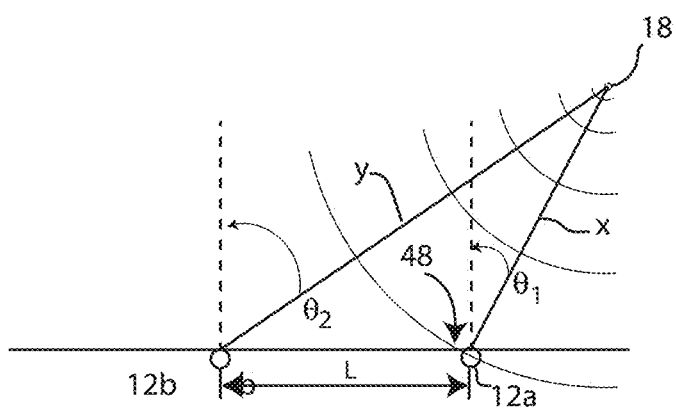
FIG. 4 illustrates how arrival times at two spaced apart microphone transducers may be used through triangulation to estimate the origin or source of a sound in space.

As shown in FIG. 1, a plurality of microphone arrays 10 each comprising a plurality of individual microphone transducers 12 arranged in a predefined pattern, such as the spiral pattern shown in FIG. 2. Other predefined patterns will also work. Each microphone array is able to capture information by which the origin direction of each sound may be determined using time of arrival of a given sound at each individual microphone. FIGS. 3 and 4 show how this is done.

As shown in FIG. 3, the sound from an event—carried by an acoustic wave originating at the event source—arrives as time-varying signals 14a and 14b at microphones 12a and 12b respectively. In FIG. 3, the acoustic wave reaches microphone 12a earlier in time than it reaches microphone 12b. Thus there is a measurable difference in arrival time at the two microphones, shown at dt in FIG. 3. Because the spacing and orientation of all microphones in the predefined array pattern are known, the arrival time difference dt between any pair of microphones can be correlated to the physical spacing and orientation of that pair of microphones. This allows the origin 18 of the event source to be calculated through triangulation, as shown in FIG. 4. To simplify this explanation, FIG. 4 illustrates a two-dimensional plane where the distance traveled from the origin 18 to microphones 12a and 12b are represented by lines x and y, respectively. This same triangulation analysis may be performed for all other paired combinations of microphones to improve accuracy.

Using the spiral array, and other two-dimensional patterns, location of an event source in three-dimensional space is made possible. This is because any two microphone transducers and the event source will lie in a common plane. A different pair of microphone transducers, not colinear with the first pair, will lie in a different plane with the event source. Thus triangulation using many different pairs of microphone transducers produces a set comprising many intersecting planes, and these planes occupy and define a three-dimensional space.

Thus while many different microphone array placements are possible within the aircraft, one suitable arrangement would be to deploy a microphone array on the ceiling within each cabin space. Exemplary locations are illustrated in FIG. 1 as indicated by the array reference numerals 10.

Figure 5:
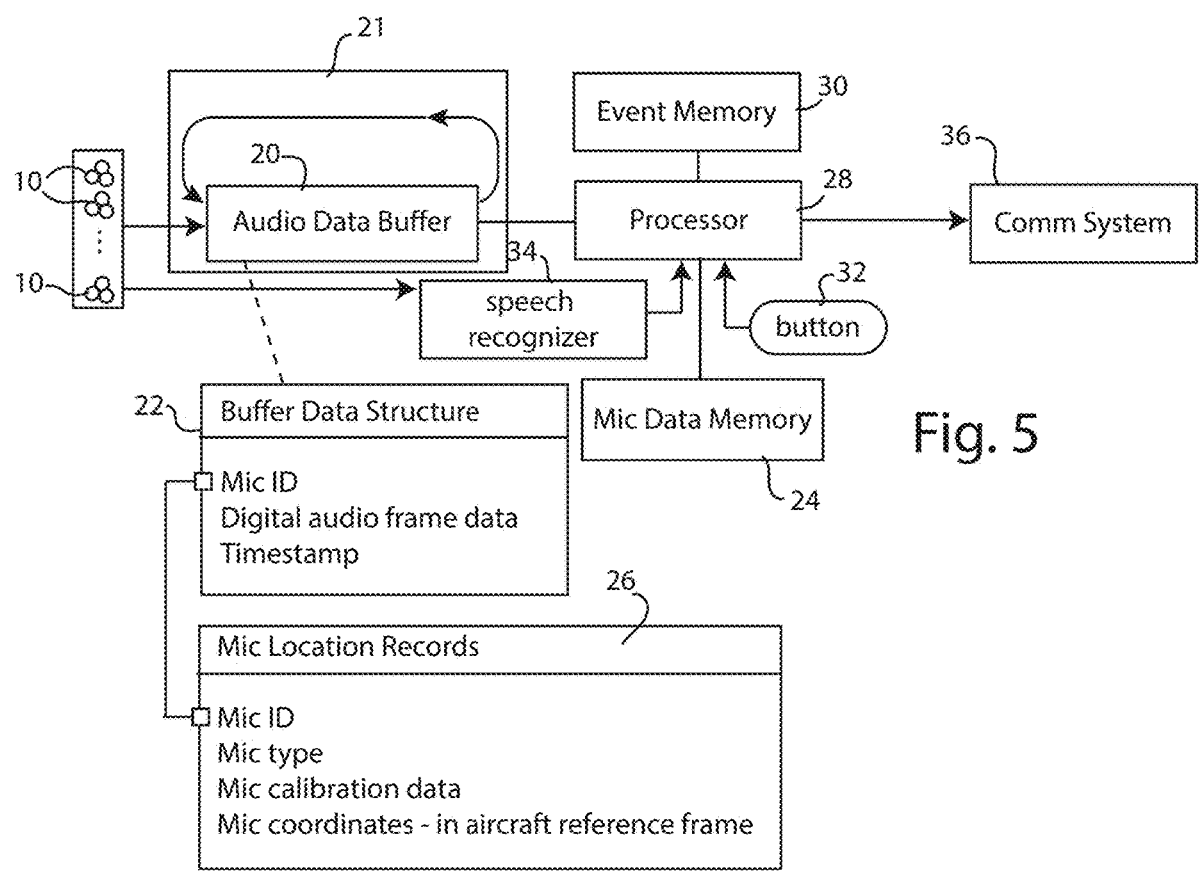
FIG. 5 is an electronic circuit diagram illustrating how the sound recorder and processor are configured to capture sounds and save sound snippets for later analysis.

The electronic circuitry for implementing the noise event location and identification system is shown in FIG. 5. The microphone arrays 10 are coupled to an audio data buffer 20 of a sound recorder device 21, which is configured to store the digitized audio bitstream from the microphone arrays as timestamped digital audio data. A suitable analog to digital converter (ADC not shown) may be used to convert the captured sounds from the microphone arrays 10 into a digital audio format, if the microphone arrays do not natively provide a digital output. It is important that digitization of all audio streams are converted in a time synchronized manner (e.g., ADC all driven by same clock) so that the data streams from each microphone in each array are all time synchronized. This is needed so that the captured audio data can be used to for the event source location discussed above.

The audio data buffer 20 of the sound recorder device 21 should be sized with sufficient digital memory to hold a predetermined amount of audio data captured from each of the microphones within each of the microphone arrays, together with timestamp information. While it would be possible to provide enough digital memory to store captured digital audio for an entire flight, this is usually not necessary. In most applications it can be sufficient to capture a predefined amount of time, such as, for example, approximately 20 to 30 minutes of data in the buffer, whereupon the buffer is reused in circular fashion to capture a subsequent 20 to 30 minutes of data, with the earlier time period being overwritten. Thus the audio data buffer 20 may be configured as a circular buffer.

The audio data buffer 20 may be organized according to a predefined buffer data structure, such as shown at 22. The buffer data structure 22 is configured by preprogramming to allocate storage for a microphone identifier (Mic ID), storage for one or more frames of digital audio frame data (the recorded digital audio data of the captured sounds) and a timestamp. As noted above the timestamp is needed when performing event source location analysis.

Also needed to perform event source location analysis is a record of where each microphone in each array is physically located within the reference frame of the aircraft cabin interior. Thus the location information for each microphone is stored in a suitable microphone data memory 24, configured using a suitable data structure, such as the microphone location records data structure 26. For each microphone identifier (Mic ID), information such as microphone type, any microphone calibration data and microphone coordinates are stored. As noted, each microphone location is specified using coordinates (such as x,y,z coordinates) in the aircraft reference frame. In this way all microphones are spatially correlated to allow accurate event source location to be performed.

A processor 28 is coupled to access the audio data buffer 20 and the mic data memory 24. Also coupled to processor 28 is an event memory 30, which is configured to store a selected portion of the information captured in the audio data buffer 20, each time an event is reported by an aircraft occupant. Specifically, when the aircraft occupant hears a noise that he or she wants to report as being annoying or possibly related to a malfunctioning component, the occupant may either press a button 32, coupled to processor 28, or verbally announce that a noise was heard by uttering a predefined phrase. Such verbal announcements are handled by a speech recognizer system 34, coupled to the processor 28 and configured to monitor the audio stream captured by the microphone arrays 10. The button may be located at either the seat, or the galley, or it may be accessed using a personal portable device such as a smartphone or tablet. The button should be positioned so that it will not be accidentally hit, causing unnecessary reports.

When an event is signaled, by button press or verbal command, the processor copies a portion of data from the audio data buffer 20 to the event memory 30. To allow ample information for analyzing the captured sound, the processor copies and transfers a certain amount of time (e.g., 5 minutes) before the event was observed and a certain amount of time (e.g. 5 minutes) after the event was observed. The timestamp at which the button was pressed, or the command was uttered is captured as part of the event memory record.

If desired, the processor 28 may be programmed to perform event source location analysis upon each record stored in the event memory record, using the microphone coordinates and the timestamp information. Alternatively, event source location analysis can be performed later, after the contents of the event memory 30 have been transferred to service center for analysis. To provide the captured event records for analysis, the processor 28 is coupled to the aircraft's communication system 36.

Figure 6:
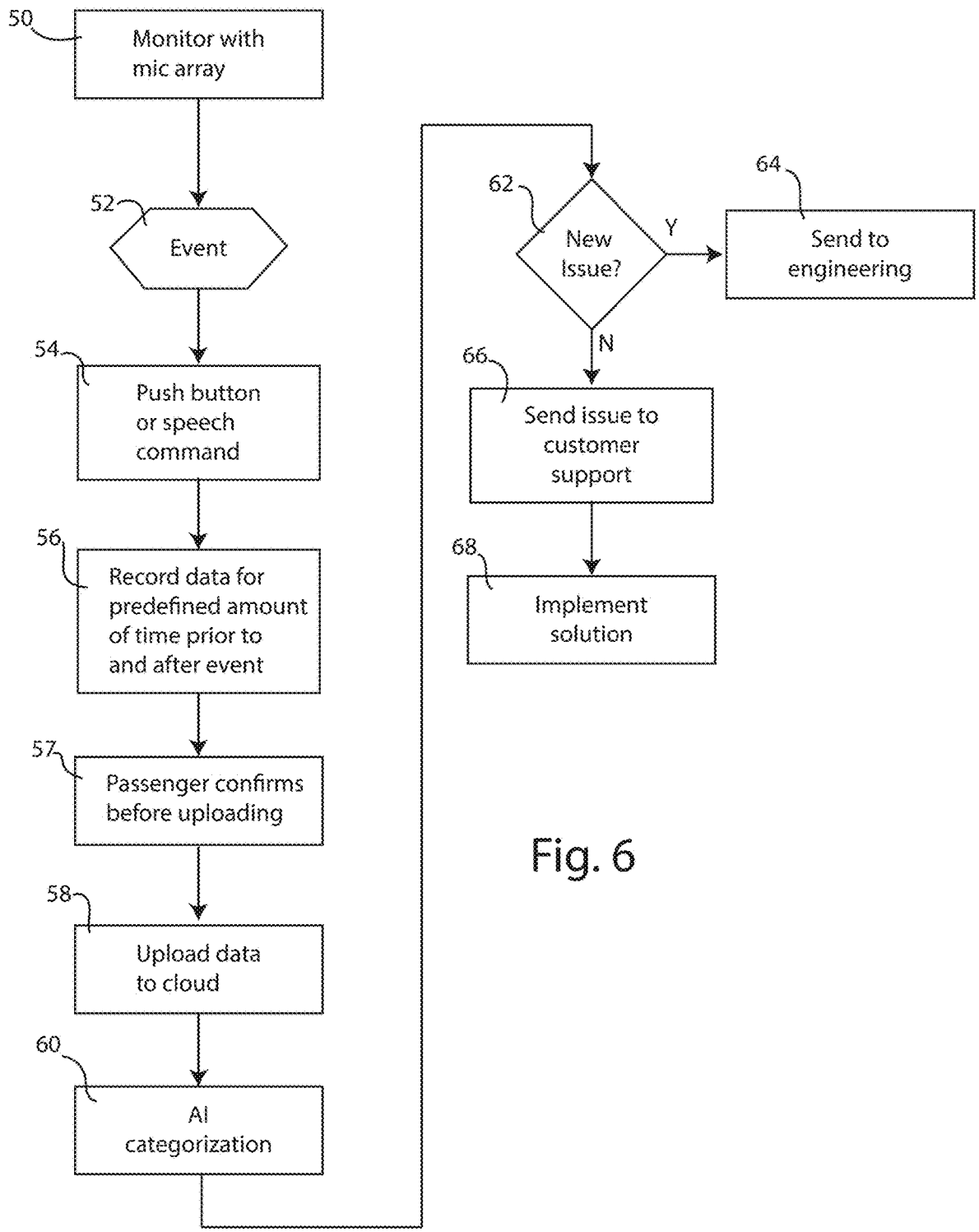
FIG. 6 is a process flow diagram useful in understanding how the disclosed system operates.

FIG. 6 gives an overview of the noise source identification and diagnosis system in use. Beginning at 50, data from the microphone arrays are monitored (copied to the audio data buffer). This happens continuously, with the buffer being overwritten in a circular fashion.

When a noise event occurs, at 52, the passenger either pushes button 32 (FIG. 5) or issues a speech command, as at 54. The processor responds at 56 by recording data a predefined amount of time, such as for example, five minutes prior to five minutes after the noise event notification. This is performed as discussed above by copying the selected time segment (approximately ten minutes) to the event memory 30 (FIG. 5).

If desired an additional confirmation step 57 is provided to let the passenger confirm before uploading the data. Thus, if the passenger hit the button or issued a speech command accidentally, they can simply cancel.

At a suitable time thereafter, the data recorded in the event memory is uploaded, as at 58, to a data processing center, which may utilize cloud data storage and/or cloud based processing servers, if desired.

Once the data are received at the data processing center, artificial intelligence categorization is performed on the data as at 60. The details of this categorization will be discussed below in connection with FIG. 8.

As a result of the categorization, the data processing center employs a processor to assess, at 62, whether the categorized noise is a new issue or not. This decision is performed by the data processing center processor based on an assigned likelihood score that the sound data being analyzed fits any of the pre-trained noise models.

If the likelihood score is low (indicating this is a new issue) the sound data and results of analysis are sent to an engineering department, at 64, for deeper analysis. Such analysis could include correlating the timestamped sound data with a separately provided Health Trend Monitoring System (HTMS) to provide even more diagnostic information for the engineering department to consider.

If the likelihood score is high (indicating this is a previously known issue), the sound data and results of analysis are sent to the customer support department, at 66, whereupon the known issue is addressed by implementing a known solution, as at 68.

The modularity of the disclosed system allows noise data capture for analysis and for training of the artificial intelligence systems. Thus while customer confidentiality is maintained (the noise data captured is used only for noise data analysis, with pre- and post-noise event data deleted), the noise data from a fleet of aircraft can be amalgamated for artificial intelligence system training.

Figure 7:
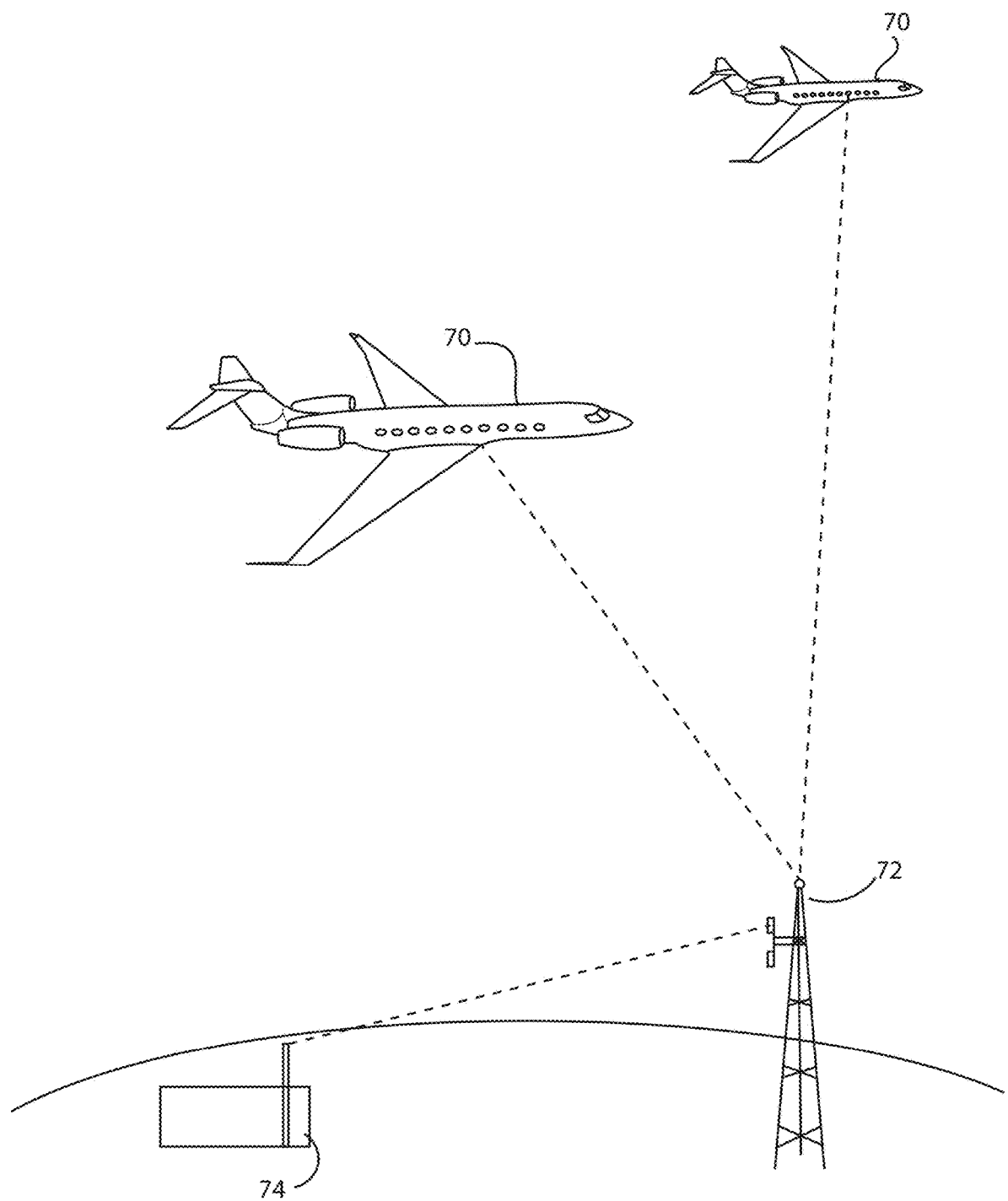
FIG. 7 is a perspective view of a fleet of aircraft, relaying captured sound snippet data to a ground-based data processing center for classification.

Referring to FIG. 7, illustrated is a fleet of aircraft 70, all communicating to a ground-based or satellite-based antenna 72, or federated collection of geographically distributed antennas. Noise event data captured within each aircraft is communicated through this ground based or satellite-based antenna system for relay to a data processing center 74. If desired the data may be compressed and/or encrypted prior to transmission. Also communicated is the microphone location and other data about each microphone, stored in the microphone data memory 24. As illustrated the data processing center may receive data using an encrypted data stream sent via an existing telecommunications infrastructure. This existing infrastructure may include cloud-based data storage and processing services. Thus the physical location of the data processing center may exist in one or more cloud servers, which may or may not be housed in the same physical location. An onboard system may be used to analyze the Directional of Arrival (DOA) information based on the microphone array data. To conserve communication bandwidth, only data from one or part of the microphone array and the DOA information may be transmitted.

Initially, the event sound data received via the aircraft communication system 36 will identify the aircraft identifier, such as its aircraft tail number, and the entire (ten minute) record captured for each event.

During the processing of the event data, much of the raw data representing actual recorded sounds before and after the event will be stripped away, to preserve customer confidentiality. Only the relevant portion of sound containing the actual event is retained.

Figure 8:
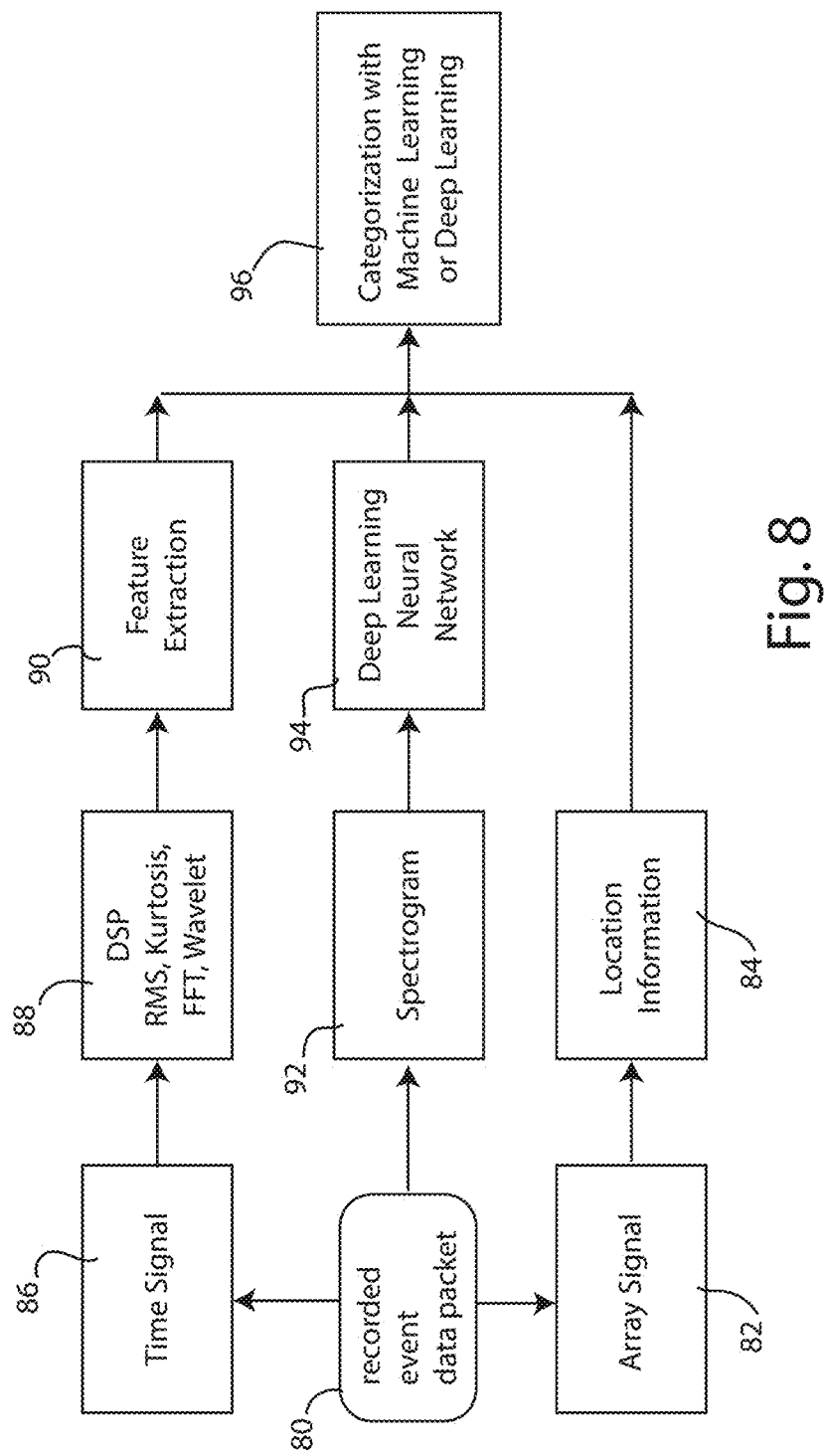
FIG. 8 is a block diagram illustrating how one or more processors or programmable gate array devices are configured to implement the artificial intelligence system for classifying captured sound snippets.

With reference to FIG. 8, the incoming event data packet 80 is delivered to the noise categorization and analysis processor of the data processing center 74. The modules shown in FIG. 8 are processing steps performed by the categorization and analysis processor.

The event data packet 80 is used in three analytical paths, one path (modules 82 and 84) extracts the location information, one path (modules 86, 88 and 90) processes the recorded audio data by feature extraction, and one path (modules 92 and 94) process the recorded audio data by deep learning neural network analysis. The results of these three paths are then used to perform categorization in module 96.

Event Origin Location Analysis

The recorded digital audio data from the microphone arrays are correlated as array signal data 82, by moving the individual microphone signals forward or backward in time until the signal peaks for each microphone in the array are time aligned. The amount of time added or subtracted to achieve alignment represents the time of arrival differences, which are then used to calculate the location of the origin of the event source. Such correlation is illustrated in FIG. 3.

Also used in the event origin location analysis are the data obtained from the microphone data memory 24 (FIG. 5). From the spatial information about the microphone locations, relative to the aircraft frame of reference, and from the time of arrival information extracted by correlating the array signal data 82, the data processing center processor triangulates using pairs of microphones as discussed above, to determine the location information 84 of the event origin in aircraft reference frame space. This location information 84 is fed to the categorization module 96.

Feature Extraction Analysis

Feature extraction is performed on the recorded event data 80, by manipulating the time signal data 86 (time domain data) to produce one or more of a family of different features. This is performed by a digital signal processor (DSP) at module 88, which expresses the time signal data in different forms (i.e. in different analysis domains), each highlighting a different aspect of the data. For example, the DSP may perform a fast Fourier transform (FFT) on the time signal data 86 to express the data in the frequency domain. Doing so, exposes the frequency content of the event for analysis.

While frequency content can be useful in categorizing an event sound, other transformations are also used—each providing a different way of understanding the event sound. Some examples of such transformation processing include:

RMS: The root mean square signal power is calculated for a given time interval. Such root mean square information allows the event sound to be understood in terms of how its loudness fluctuates with time.

Kurtosis: Kurtosis is a statistical measure of the degree to which peakedness or transients are present in the event sound. Kurtosis allows separation of ambient noise from manmade sounds.

Wavelet: Wavelet analysis reveals how the frequency content of the event sound changes with time.

While the above represent some transforms that are useful in sound categorization, the list is by no means exhaustive.

Once the data have been processed by the DSP at 88, feature extraction is performed at 90. During feature extraction the features revealed by each of the DSP processing transforms are expressed as parameters, organized according to one or more predefined models. By such parameterization, the collection of features can be compared with previously constructed models that are trained using sounds from known sources. By constructing models in advance, for sound-produced features of all components subject to failure and vibrating structures onboard the aircraft, it becomes possible to categorize an unknown sound by testing it against each of the trained models to obtain a likelihood score that the unknown sound could have been generated by each of the trained models. The model with the highest likelihood score is then used to categorize the unknown sound. In some instances, the n-best likelihood scores are used to yield several "opinions" on what is causing the unknown sound. By using location information, obtained by module 84, it may be possible to select the correct cause from these n-best options.

Deep Learning Neural Network

The deep learning neural network is composed of layers of nodes (computer-implemented neurons). The first layer, termed the input layer, is followed by a number of hidden layers which ultimately feed the output layer. The neurons are coupled to one another through connections, termed synapses, which have an associated weight which impacts the preceding neuron's importance in the overall neural network. These weights are adjusted through training.

In addition to having trainable weights, the neurons are also constructed to embed what is termed an activation function, which governs what information the neuron generates to pass on to the next layer.

Figure 9:
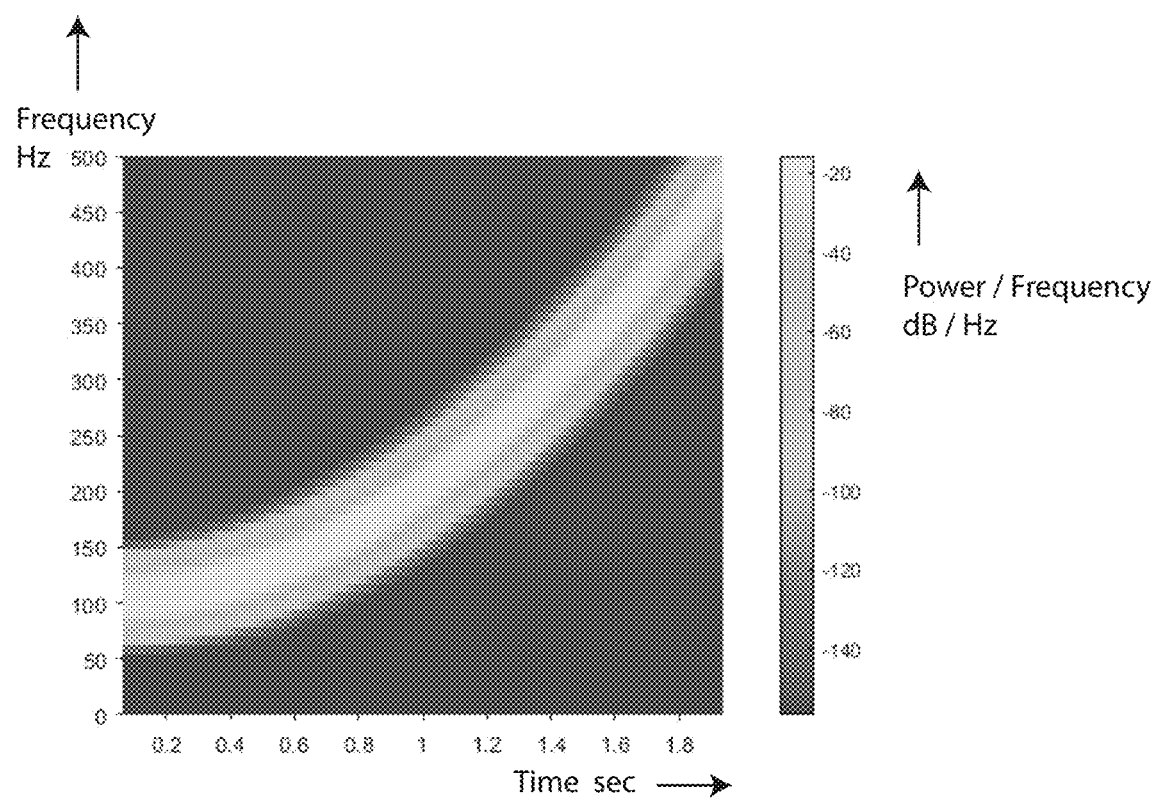
FIG. 9 illustrates an exemplary three-dimensional sound spectrum image of the type that may be analyzed by the neural network portion of the artificial intelligence system of FIG. 8.

For the disclosed event sound classifier, the deep learning neural network is designed to operate on the recorded event data 80 as if it were multi-dimensional graphical information. Expressing the recorded audio data as graphical data plays into one of the strengths of the deep learning neural network. Accordingly, the recorded event data is expressed in the form of a spectrogram 92, which may be produced, for example, by expressing the digital audio data graphically as a waterfall diagram, which conveys both frequency distributions of the audio sounds but also their time varying nature in a single graphical image. Thus the single graphical image would have three dimensions: signal strength, frequency and time. In order to present such three dimensional information in a two dimensional image frame, color may be used to convey one of the three dimensions. An illustration of this is shown in FIG. 9, in which the color dimension is shown in grayscale.

In a fashion similar to the way the feature extraction models were trained, the deep learning neural network 94 is trained on a collection of sounds, in all likelihood the same sounds used to train the feature extraction models. During training, these sounds are expressed a three-dimensional graphical images to represent signal strength, frequency and time.

Having employed location information, feature extraction and deep learning neural network analysis, the final categorization module 96 makes the final decision whether the event sound can be categorized according to one of the training sounds, or whether the event sound represents something new. It was discussed above how location information can help single out the most likely candidate identified through feature extraction. The same process can be used to validate the neural network candidate—if the neural network candidate exists in a location observed by the array signal data, then the candidate is validated; if not, then the candidate is subject to question.

A similar process can be used to weigh the results of the feature extraction and neural network processes. If both feature extraction results and neural network results agree, and are consistent with the location information, then a very high degree of confidence can be assigned to the categorization. In some instances, the neural network candidate may correspond to one of the n-best feature extraction candidates. Such correlation can be used to increase the likelihood score of that candidate.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A system for categorizing sounds comprising:
   at least one array comprising a plurality of individual sound pickup transducers arranged in a predetermined pattern, each array deployed in a known location in an enclosed area;
   a sound recorder coupled to the at least one transducer and configured to store sounds captured by the at least one transducer; and
   a processor coupled to the sound recorder and having a user interface through which a person within the enclosed area issues a command signifying the occurrence of a sound for which categorizing is requested;

the processor having an associated digital memory configured to store at least one audio snippet;

the processor being programmed to respond to the issued command by extracting and storing an audio snippet copied from the audio recorder, the snippet corresponding to sound captured before, during and after the issued command; and the processor having a data transfer port by which the stored audio snippet is communicated to an artificial intelligence system trained to categorize sounds as to what produced them;

wherein the artificial intelligence system comprises a sound direction extraction system that estimates sound direction, relative to an origin of sounds captured by the individual sound pickup transducers, and that determines a location of the origin; and wherein the artificial intelligence system analyzes time of arrival information of the sounds captured by the individual sound pickup transducers to estimate the sound direction and to determine the location of the origin.

2. The system of claim 1 wherein the sound recorder is a digital audio recording circuit that stores sounds as digital data.

3. The system of claim 1 wherein the sound recorder is a digital audio recording circuit that stores sounds as digital data having associated timestamp data.

4. The system of claim 1 wherein the sound recorder is implemented using the processor.

5. The system of claim 1 wherein the audio snippets are of a predetermined length.

6. The system of claim 1 wherein the user interface provides a button with which the person issues the command signifying the occurrence of a sound for which categorizing is requested.

7. The system of claim 1 wherein the user interface provides a speech recognizer by which the person issues a voiced command signifying the occurrence of a sound for which categorizing is requested.

8. The system of claim 1 wherein the data transfer port is coupled to a communication system in the enclosed area, for communicating with a ground-based artificial intelligence system trained to categorize sounds as to what produced them.

9. The system of claim 1 wherein the artificial intelligence system comprises at least one trained model recognition system employing feature extraction.

10. The system of claim 1 wherein the artificial intelligence system comprises at least one neural network categorization system.

11. The system of claim 10 wherein the neural network categorization system is configured to operate on a spectrogram representation of sounds.

12. The system of claim 10 wherein the neural network categorization system is configured to operate on a multi-dimensional representation of sounds.

* * * * *